US012181597B2

(12) United States Patent
Pylappan (10) Patent No.: US 12,181,597 B2
(45) Date of Patent: Dec. 31, 2024

(54) MITIGATING SIGNAL LOSS AND DIRECTIONAL AMBIGUITY WITH DYNAMIC LOCATION DATA SAMPLING

(71) Applicant: RAKUTEN GROUP, INC., Tokyo (JP)

(72) Inventor: Seejo K. Pylappan, San Mateo, CA (US)

(73) Assignee: RAKUTEN GROUP, INC., Tokyo (JP)

( * ) Notice: Subject to any disclaimer, the term of this patent is extended or adjusted under 35 U.S.C. 154(b) by 427 days.

(21) Appl. No.: 17/748,247

(22) Filed: May 19, 2022

(65) Prior Publication Data

US 2022/0373633 A1 Nov. 24, 2022

Related U.S. Application Data

(60) Provisional application No. 63/192,324, filed on May 24, 2021.

(51) Int. Cl.
*H04W 4/02* (2018.01)
*G01S 5/00* (2006.01)
*G01S 5/02* (2010.01)
*H04W 4/021* (2018.01)
*H04W 4/029* (2018.01)

(52) U.S. Cl.
CPC .......... *G01S 5/0244* (2020.05); *G01S 5/0027* (2013.01); *H04W 4/021* (2013.01); *H04W 4/029* (2018.02)

(58) Field of Classification Search
CPC ................................................... H04W 4/029
See application file for complete search history.

(56) References Cited

U.S. PATENT DOCUMENTS

| | | | |
|---|---|---|---|
| 6,426,719 B1 | 7/2002 | Nagareda et al. | |
| 2012/0078501 A1 | 3/2012 | Haleem | |
| 2016/0077532 A1 | 3/2016 | Lagerstedt et al. | |
| 2021/0136518 A1 | 5/2021 | Borras et al. | |
| 2021/0195379 A1* | 6/2021 | Klinkner | G01S 5/04 |
| 2022/0004793 A1 | 1/2022 | Borras et al. | |
| 2022/0019924 A1* | 1/2022 | Lewin | H04W 4/38 |

(Continued)

FOREIGN PATENT DOCUMENTS

| | | |
|---|---|---|
| JP | 2000-352519 A | 12/2000 |
| JP | 2009-281814 A | 12/2009 |

(Continued)

OTHER PUBLICATIONS

Japanese Notice of Reasons for Refusal; dated Dec. 19, 2023; application # 2022-081710.

(Continued)

*Primary Examiner* — Michael T Vu
(74) *Attorney, Agent, or Firm* — Polsinelli PC (57) ABSTRACT

Exemplary methods, apparatuses, and systems read location data representing a current location of a mobile device. The location data for the mobile device is taken at a first sampling rate. Upon determining that the location data indicates that the mobile device is approaching a geographic area having a history of wireless communication loss, the mobile device is triggered to increase location data sampling from the first sampling rate to a second sampling rate.

20 Claims, 5 Drawing Sheets

(56) References Cited

U.S. PATENT DOCUMENTS

2022/0036300 A1\* 2/2022 Volkerink .......... G06Q 10/0833
2022/0048432 A1\* 2/2022 Switalski ............... G08G 1/205

FOREIGN PATENT DOCUMENTS

JP          2012-233791 A     5/2011
JP          2014-224715 A     12/2014

OTHER PUBLICATIONS

US office action from related U.S. Appl. No. 17/748,328; dated Jul. 18, 2024.
Japanese Notice of Reasons for Refusal; dated: Jun. 6, 2023; Application # 2022-081710.

\* cited by examiner

MITIGATING SIGNAL LOSS AND DIRECTIONAL AMBIGUITY WITH DYNAMIC LOCATION DATA SAMPLING

CROSS-REFERENCE TO RELATED APPLICATIONS

This application claims the benefit under 35 U.S.C. § 119(e) of the filing date of U.S. Provisional Patent Application No. 63/192,324, filed on May 24, 2021, entitled "MITIGATING SIGNAL LOSS AND DIRECTIONAL AMBIGUITY WITH DYNAMIC LOCATION DATA SAMPLING," the entirety of which is herein incorporated by reference.

TECHNICAL FIELD

The present disclosure generally relates to tracking the location of a device, and more specifically, relates to a device sharing location data at an increased interval when determined to be moving toward or within a threshold distance of a geographic area with a history of wireless communication loss. Additionally, the present disclosure relates to a device sharing location data at an increased interval when current location data is insufficient to determine a direction of travel.

BACKGROUND

Services that include delivery and pick up of persons or things can use location tracking to provide users with an indication of estimated and/or imminent arrival. For example, a mobile device can transmit location data to another device to facilitate the tracking of an estimated arrival of a person or thing.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to tracking location data to determine an estimated time of arrival (ETA). For example, services that include delivery and pick up of persons or things use location tracking to provide users with an indication of estimated and/or imminent arrival. A mobile device, such as a cellular telephone, can transmit location data to a server to facilitate the tracking of an estimated arrival of a person or thing. Determining an estimated time of arrival can be difficult, however, when the mobile device passes through a geographic area with a history of wireless communication loss (a "dead zone") in which the mobile device is unable to communicate location data to the server.

Additionally, determining an estimated time of arrival can be complicated by location data that is insufficient to indicate a direction of travel. For example, the mobile device may not travel the most direct path to the location for which the system is attempting to estimate a time arrival. A detour, an intermediate destination, or other deviation from the most direct path can significantly alter a prediction of estimated or imminent arrival. As such, when the location data is insufficient for determining if a mobile device is traveling in a particular direction, it is difficult to generate an accurate estimated time of arrival.

Embodiments described herein address the above and other deficiencies by tracking location data at a dynamic frequency based on the mobile device's location relative to a dead zone or directional ambiguity. For example, a host system receives location data at a limited interval by default to minimize power usage and/or processing resources. The host system transmits one or more messages to a mobile device to trigger an increase the rate at which the mobile device shares location data with the host system. The mobile device is triggered to transmit location data at a more frequent interval, e.g., when the mobile device is within a threshold distance of a dead zone or when the mobile device's current location data is insufficient to determine a direction of travel for the mobile device. As a result, the system can minimize tracking the user device location to conserve user device power when less frequent location sharing will suffice and increase the rate at which the mobile device shares location data to mitigate the complication of traveling through a dead zone and/or directional ambiguity.

Figure 1:
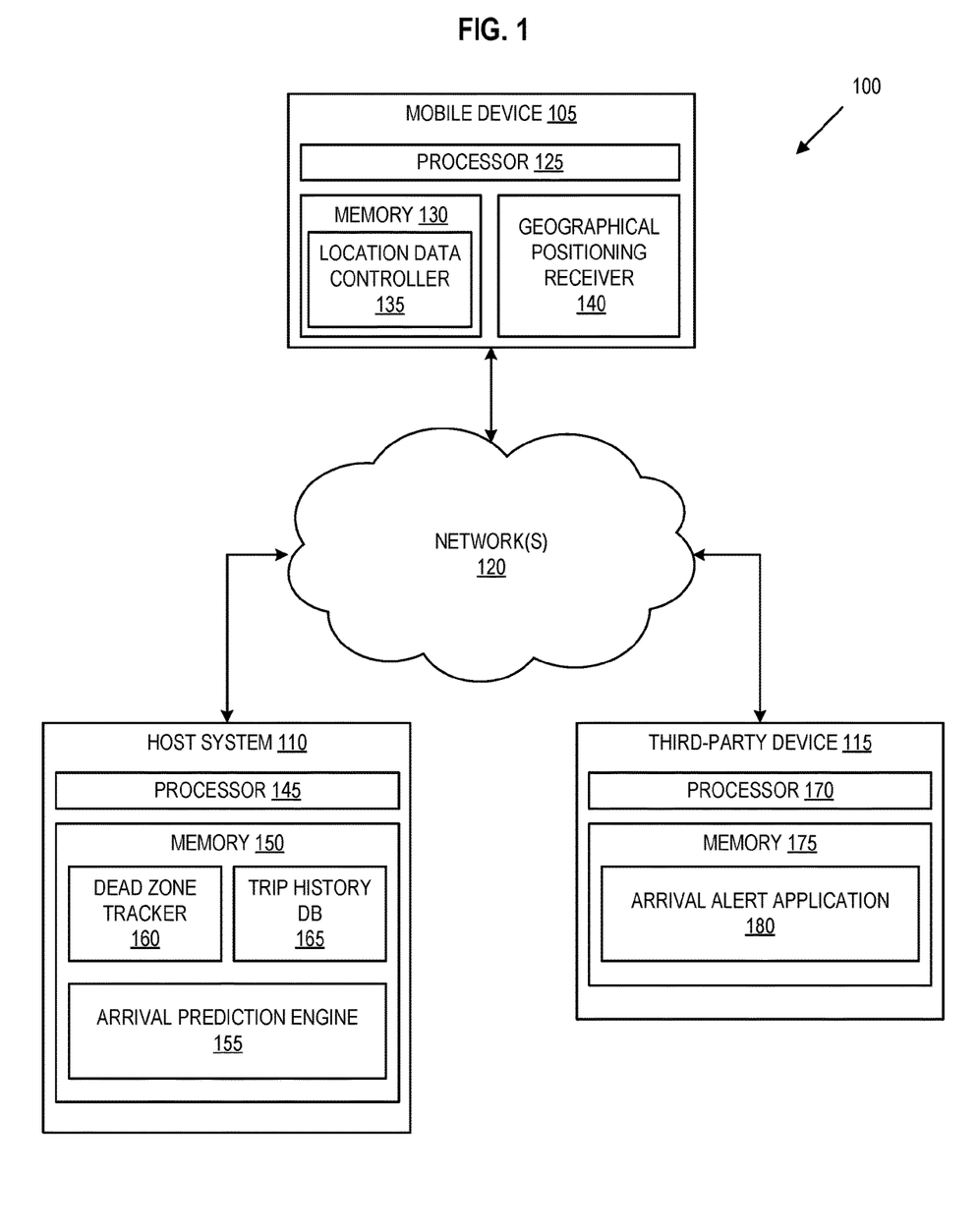
FIG. 1 illustrates, in block diagram form, an exemplary dynamic location tracking system.

FIG. 1 illustrates, in block diagram form, exemplary dynamic location tracking system 100. The dynamic location tracking system includes mobile device 105, host system 110, and third-party device 115 coupled to one or more networks 120. For example, mobile device 105 transmits location data at a dynamic frequency to host system 110. Host system 110 sends one or more messages to mobile device 105 to trigger changes in the frequency at which mobile device 105 transmits location data. Host system 110 also provides an estimation of an arrival of mobile device 105 to third-party device 115.

Mobile device 105 includes processor 125 coupled to memory 130. As used herein, "coupled to" or "coupled with" generally refers to a connection between components, which can be an indirect communicative connection or direct communicative connection (e.g., without intervening components), whether wired or wireless, including connections such as electrical, optical, magnetic, etc. Mobile device 105 uses processor 125 and memory 130 to execute one more operations involved in the dynamic location tracking described herein.

Processor 125 represents one or more general-purpose processing devices such as a microprocessor, a central processing unit, or the like. More particularly, processor 125 is a processing device that can be a complex instruction set computing (CISC) microprocessor, reduced instruction set computing (RISC) microprocessor, very long instruction word (VLIW) microprocessor, or a processor implementing other instruction sets, or processor(s) implementing a combination of instruction sets. Processor 125 can also be one or more special-purpose processing devices such as an application specific integrated circuit (ASIC), a field programmable gate array (FPGA), a digital signal processor (DSP), network processor, or the like. Processor 125 is configured to execute instructions for performing the operations discussed herein.

Memory 130 can include non-volatile memory, volatile memory, or a combination thereof. Memory 130 is an example of a machine-readable storage medium (also known as a computer-readable storage medium) on which is stored one or more sets of instructions or software embodying any one or more of the methodologies or functions described herein. For example, location data controller 135 can be implemented as a set of instructions or software that manages the dynamic location tracking described in greater detail below. In one embodiment, location data controller 135 updates a location data sampling rate (e.g., the rate at which mobile device 105 transmits location data to host system 110) in response to one or more triggers, as described below. Additionally, memory 130 can store trigger messages and/or data received from host system 110 (e.g., an instruction to change a location data sampling rate, a location of a dead zone, a location of a dead zone threshold, a threshold distance from a dead zone, etc.).

Mobile device 105 determines its location using a geographical positioning receiver 140 (e.g., global positioning system (GPS)), assisted GPS (A-GPS), cellular tower data (e.g., nearest tower, triangulation, etc.), wireless network data (e.g., a listing of known Wi-Fi network connections within geographical areas), or a combination thereof. For example, mobile device 105 may determine that it is within or outside of a threshold distance from a dead zone, location of directional ambiguity, or pickup/drop off location based upon latitude and longitude values determined by geographical positioning receiver 140 and/or latitude and longitude values associated with a wireless network signal received by mobile device 105.

Mobile device 105 can include additional components that are not illustrated, such as a network interface device to communicate over network(s) 120. For example, mobile device can include one or more wireless transceivers, such as a Wi-Fi transceiver, a Bluetooth transceiver, a wireless cellular telephony transceiver (e.g., 3G, 4G, 5G, etc.), or another wireless protocol transceiver to connect mobile device 105 with another device, external component, or a network and receive instructions, data, etc. Additionally, one or more buses, can be used to interconnect the various components of mobile device 105.

Host system 110 includes processor 145 coupled to memory 150. Similar to the description of processor 125 above, processor 145 represents one or more general-purpose processing devices such as a microprocessor, a central processing unit, or the like. Additionally, memory 150 can include non-volatile memory, volatile memory, or a combination thereof.

Memory 150 is another example of a computer-readable storage medium on which is stored one or more sets of instructions or software embodying any one or more of the methodologies or functions described herein. For example, arrival prediction engine 155 and dead zone tracker 160 can each be implemented as a set of instructions or software that manage(s) the dynamic location tracking and estimation of the arrival of mobile device 105 described in greater detail below.

Arrival prediction engine 155 determines an estimated time of arrival for mobile device 105 to reach a destination. For example, arrival prediction engine 155 can determine (or estimate) a route for mobile device 105 to travel to reach the destination, the distance along that route, the speed limit(s) along that route, traffic patterns along that route, etc. to estimate an arrival time. In one embodiment, arrival prediction engine reads or otherwise uses data of a history of previous trips made by mobile devices stored in trip history database 165 to determine, e.g., a most likely route, traffic patterns, etc. In one embodiment, arrival prediction engine 155 transmits one or more messages to mobile device 105 to trigger mobile device 105 to share location data more or less frequently, as described in greater detail below.

Dead zone tracker 160 determines geographic areas with a history of wireless communication loss. For example, dead zone tracker 160 can create a heat map of locations that were shared with host 110 and determine that "cold" spots on the heat map (map locations from which location data is not received at or above a threshold amount) correspond to areas with a history of wireless communication loss. In one embodiment, dead zone tracker 160 deems cold spots that coincide with paths that a mobile device would follow (e.g., roads, highways, railways, etc.) as areas with a history of wireless communication loss.

In another embodiment, dead zone tracker 160 uses trip history database 165 to detect when location data was expected but not received, based upon a frequency of location data sharing by a mobile device. In one embodiment, arrival prediction engine 155 creates a log in trip history database 165 of received shared locations along with time stamps and/or time stamps of when location data is expected but not received. Dead zone tracker 160 can estimate a location or area in which location data is expected but not received based upon the frequency at which location data was shared along the route before and after the "missed" location(s) and the locations before and after the missed location(s). In one embodiment, dead zone tracker 160 associates missed locations of different trips in trip history database 165. For example, dead zone tracker 160 can combine different missed locations into a single geographical area/dead zone if those locations are within a threshold distance of one another. When the number of missed location(s) within a geographical area reaches a threshold number, dead zone tracker 160 designates the area as a dead zone. In one embodiment, dead zone tracker 160 further uses traffic patterns, speed limits, and other data along the route to estimate the location or area of a dead zone. Dead zone tracker 160 stores the determined dead zone, e.g., in trip history database 165.

Additionally, dead zone tracker 160 can use trip history database 165 to detect when the location or ETA for a location is inconsistent with the location or ETA of each of one or more other locations in the trip. For example, if the location or ETA at the location changes at a rate at or beyond a threshold (amount or rate of change), dead zone tracker 160 can determine that the location data shared is incorrect. Incorrect location data can be the result of, e.g., an urban canyon or other physical factors that can contribute to poor GPS signal reception. In one embodiment, dead zone tracker 160 designates areas associated with incorrect or otherwise unreliable location data as dead zones as well.

Host system 110 can also include additional components that are not illustrated, such as a network interface device to communicate over network(s) 120 and one or more APIs to enable communication between mobile device 105 and host system 110 and/or between third-party device 115 and host system 110. Additionally, one or more buses, can be used to interconnect the various components host system 110.

Third-party device 115 includes processor 170 coupled to memory 175. Similar to the description of processor 125 above, processor 170 represents one or more general-purpose processing devices such as a microprocessor, a central processing unit, or the like. Additionally, memory 175 can include non-volatile memory, volatile memory, or a combination thereof.

Memory 175 is another example of a computer-readable storage medium on which is stored one or more sets of instructions or software embodying any one or more of the methodologies or functions described herein. For example, arrival alert application 180 can be implemented as a set of instructions or software to receive messages from host system 110 regarding the estimation of the arrival of mobile device 105. In one embodiment, arrival alert application 180 uses messages from host system 110 to generate an alert of an imminent arrival of mobile device 105 at a destination.

Like mobile device 105 and host system 110, third-party device 115 can also include additional components that are not illustrated, such as a network interface device to communicate over network(s) 120, one more buses, etc.

In various embodiments, hardwired circuitry may be used in combination with the software instructions to implement the present embodiments. Thus, the techniques are not limited to any specific combination of hardware circuitry and software, or to any particular source for the instructions executed by processor 125, processor 145, and/or processor 170.

Figure 2:
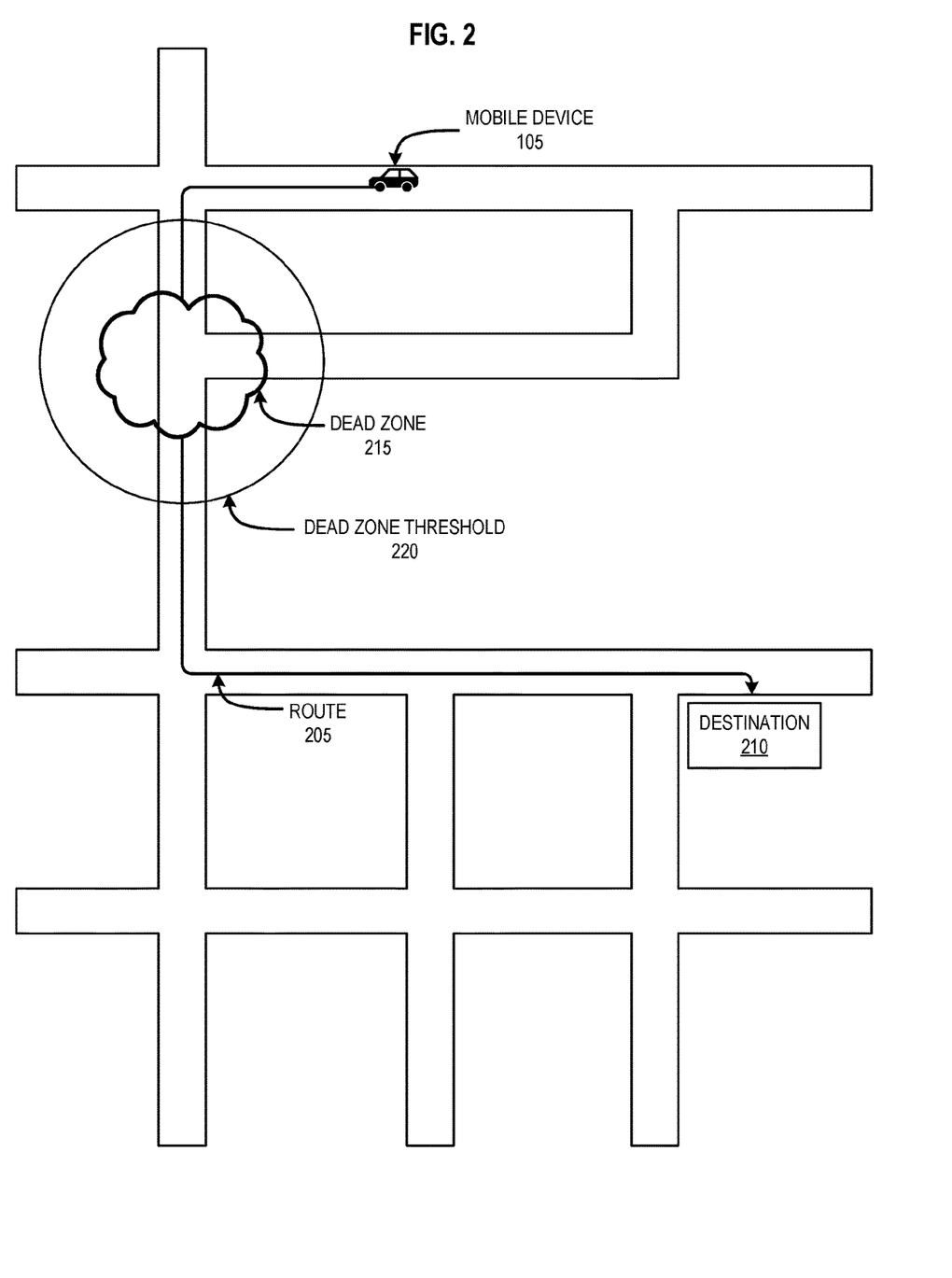
FIG. 2 illustrates an example of triggering dynamic tracking of a user device based on a geographic area with a history of wireless communication loss.

FIG. 2 illustrates an example of triggering dynamic tracking of a user device based on a geographic area with a history of wireless communication loss. In this example, mobile device 105 is within or is a part of an automobile traveling along route 205 to destination 210. In one embodiment, arrival prediction engine 155 determines the location of destination 210 using input from mobile device 105 and/or third-party device 115. For example, arrival prediction engine 155 uses an inputted address or latitude and longitude at which mobile device 105 will pick up or drop off someone or something. In one embodiment, third-party device 115 is located at destination 210 and third-party device 115 uses a geographical positioning receiver to determine and share the location for destination 210. Arrival prediction engine 155 can further use location data shared by mobile device 105 to determine route 205 between mobile device 105 and destination 210.

As described above, dead zone tracker 160 determines and stores geographic areas with a history of wireless communication loss. In this example, dead zone tracker 160 detected and stored dead zone 215. Additionally, arrival prediction engine 155 has determined route 205 passes through dead zone 215. For example, when determining route 205, arrival prediction engine 155 can detect if any locations along route 205 fall within a dead zone determined and stored by dead zone tracker 160.

In one embodiment, host system 110 sets a threshold distance around a dead zone to serve as a trigger for dynamic tracking of a user device. For example, dead zone threshold 220 represents an area around dead zone 215 in which mobile device 105 increases a location data sampling rate. In one embodiment, host system 110 transmits a message to mobile device 105 to trigger the increase in the location data sampling rate. For example, in response to arrival prediction engine 155 determining route 205 passes through dead zone 215, host system 110 can request the increase in the location data sampling rate upon receiving location data indicating that mobile device 105 is withing dead zone threshold 220 or host system 110 can transmit data for dead zone threshold 220 to mobile device 105 and mobile device 105 can detect when it is within dead zone threshold 220 to trigger the increase. In one embodiment, arrival prediction engine 155 determines the size and/or location of dead zone threshold 220 using traffic patterns, speed limits, and other data from trip history database 165 along or analogous to route 205. For example, arrival prediction engine 155 can set a large threshold for a route with high speeds of traffic, such as a highway, and small threshold for a route with low speeds of traffic, such as a residential road. As a result, the threshold will provide sufficient distance to trigger the increase in location sampling prior to the mobile device entering the dead zone while avoiding an early increase that can lead to oversampling location data and the corresponding drain on mobile device resources, such as battery life.

While dead zone threshold 220 is illustrated as a circle, different boundaries may be used to facilitate triggering a change in dynamic tracking of mobile device 105. For example, dead zone threshold 220 can be implemented as a combination of boundary streets or any arbitrary shape defined by latitude and longitude points.

In one embodiment, mobile device 105 does not attempt to send location data to host system 110 when mobile device 105 has no or a poor connection to a cellular or other data network (e.g., within dead zone 215). Mobile device 105 may be able to obtain location data, e.g., via a GPS signal, but not efficiently communicate the location data with host system 110 (or communicate at all). Attempting to send the location data under such circumstances can be an unnecessary drain on the battery life of mobile device 105. As such, mobile device can use a minimum network connection threshold (e.g., based on signal strength value and/or communication protocols) as a trigger for sharing location data with host system 110. For example, the increased location data sampling rate can cause mobile device 105 to test data connectivity more frequently and determine if network connection signal is of poor strength or on an older generation protocol (e.g., third generation/3G). If mobile device 105 determines the network connection is poor or disconnected, mobile device 105 does not attempt to transmit location data and waits to try again as dictated by the current sampling rate.

Figure 3:
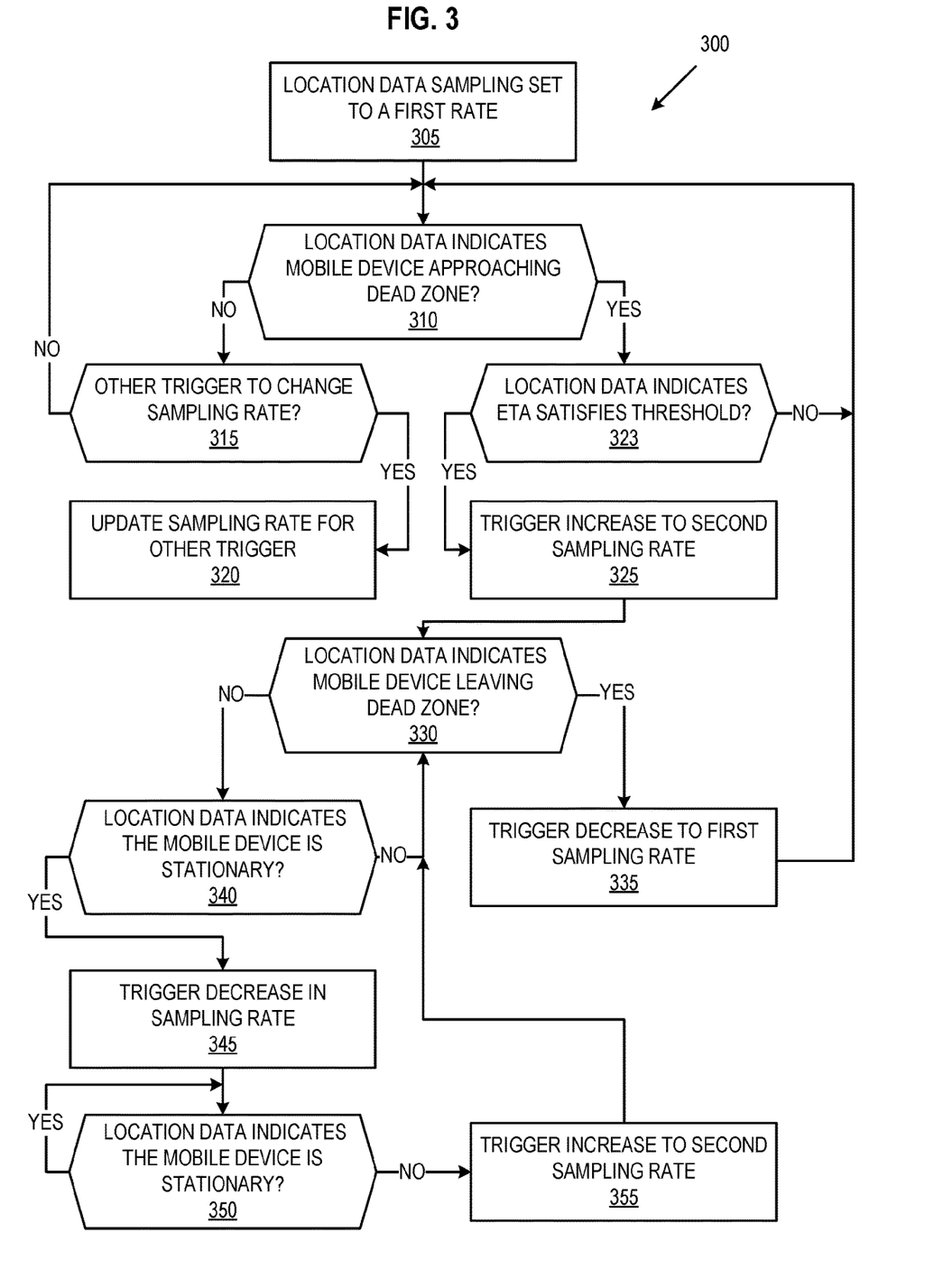
FIG. 3 is a flow chart illustrating an exemplary method of estimating arrival using dynamic tracking of a user device with a geographic area with a history of wireless communication loss.

FIG. 3 is a flow chart illustrating exemplary method 300 of estimating arrival using dynamic tracking of a user device with a geographic area with a history of wireless communication loss. Method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by location data controller 135, arrival prediction engine 155, or a combination thereof. For the purpose of illustrating an example, method 300 is described below as being performed by a processing device.

At operation 305, the processing device sets location data sampling to a first rate. The first location data sampling rate can be set such that the rate conserves resources until triggered to sample more frequently. Mobile device 105 can share location data periodically and/or based upon a change in location. In one embodiment, mobile device 105, using the first rate, reads or otherwise obtains data describing a current location of mobile device 105 (e.g., GPS coordinates) and shares infrequent location updates in intervals of one or more minutes (e.g., 5 minutes) or when the location of mobile device 105 has changed by a significant amount (e.g., 500 meters). As described above, mobile device 105 will forgo an attempt to transmit location data to host system 110 when network connectivity for mobile device 105 fails to satisfy a threshold (e.g., signal strength and/or generation of protocol).

In one embodiment, host system 110 transmits one or more messages to mobile device 105 including threshold distance(s) from location(s) to trigger changes in the dynamic location data sampling rate. For example, host system 110 may transmit latitude and longitude values for destination 210 and a threshold distance to be used (e.g., as radius) from the latitude and longitude values as a threshold distance from destination 210. When outside of this destination threshold, mobile device 105 can use an infrequent sampling rate (e.g., the first rate) and increase the sampling to a more frequent rate (e.g., the second rate) when within the destination threshold. For example, the threshold distance from destination 210 can be approximately 800 meters.

Additionally, host system 110 may transmit latitude and longitude values for dead zone 215 and a threshold distance from the latitude and longitude values or equivalent locations (e.g., dead zone threshold 220) to be used to trigger dynamic changes to the sampling rate as discussed below. In some embodiments, host system 110 receives location data from mobile device 105 and transmits instructions to change the sampling rate in response to host system 110 detecting mobile device 105 has crossed or otherwise satisfied a threshold.

In one embodiment, one or more of the threshold distances are dependent upon the density of businesses/residences in proximity to destination 210 and/or dead zone 215. Smaller threshold distances may be better suited for areas of greater density as a result of a higher likelihood of users being within proximity to destination 210 and/or dead zone 215 other than following/completing route 205. As a result of using one or more smaller threshold distance(s), users in an area of greater density are still afforded some privacy in their location data and able to conserve processing and battery resources when location tracking is not as useful.

At operation 310, the processing device determines if the location data indicates that the mobile device is approaching a dead zone. In one embodiment, mobile device 105 determines its location (e.g., using geographical positioning receiver 140) and compares the determined location to dead zone threshold 220. In another embodiment, host system 110 determines location data received from mobile device 105 and compares the location to dead zone threshold 220. If the location data indicates that the mobile device is not currently approaching a dead zone (e.g., the location of mobile device 105 remains outside of dead zone threshold 220), method 300 proceeds to operation 315. If the location data indicates that the mobile device is approaching a dead zone (e.g., the location of mobile device 105 is within dead zone threshold 220), method 300 proceeds to operation 323.

At operation 315, the processing device determines if another trigger has occurred to change the location data sampling rate. For example, the processing device compares the location data to another threshold (e.g., a threshold distance from destination 210). Similar to operation 310, mobile device 105 or host system 110 can compare the location data to one or more thresholds. If another trigger has occurred (e.g., the location of mobile device 105 is within a threshold of destination 210), method 300 proceeds to operation 320. If another trigger has not occurred, method 300 returns to operation 310 and mobile device 105 continues to sample/share location data infrequently (at the first rate).

At operation 320, the processing device updates the location data sampling rate in response to the other trigger. For example, if the location data indicates mobile device 105 is within the destination threshold, mobile device 105 updates the data sampling rate/transmits location data to host system 110 more frequently (e.g., at the second rate).

In one embodiment, third-party device 115 uses the location data to determine when mobile device 105 is approaching destination 210. For example, the destination threshold (or another threshold) may trigger host system 110 to share location data from mobile device 105 with third-party device 115 or otherwise alert third-party device 115 that mobile device 105 is approaching destination 210.

At operation 323, the processing device determines if the location data indicates that the ETA for the mobile device to arrive at the destination satisfies a time threshold. For example, arrival prediction engine 155 can calculate a current ETA for mobile device to reach destination 210 using one or more of: a current velocity, traffic patterns, speed limits, and other data from trip history database 165 along or analogous to route 205. If the current ETA exceeds a threshold time value, the processing device can determine that the ETA does not satisfy the time threshold, the sampling rate is not going to be updated to compensate for the dead zone, and method 300 returns to operation 310. If the current ETA is less than or equal to a threshold time value, the processing device can determine that the ETA satisfies the time threshold and method 300 proceeds to operation 325.

At operation 325, the processing device updates the location data sampling rate in response to determining the location data indicates that the mobile device is approaching a dead zone. For example, if the location data indicates mobile device 105 is within dead zone threshold 220, mobile device 105 updates the location data sampling rate/transmits location data to host system 110 more frequently (e.g., at the second rate). In one embodiment, mobile device 105 updates the location data sampling rate in response to detecting its location data indicates it is approaching a dead zone. In another embodiment, mobile device 105 updates the location data sampling rate in response to host system 110 detecting location data from mobile device 105 indicates mobile device 105 is approaching a dead zone and host system 110 instructing mobile device 105 to increase the location data sampling rate. In one embodiment, mobile device 105, using the second rate, shares frequent location updates in intervals of one or more seconds (e.g., every second) and/or based upon any detectable change in location of mobile device 105. As a result, host system 110 can compensate for loss of communication within dead zone 215 and more accurately estimate a time of arrival of mobile device 105 at destination 210 and/or determine if mobile device 105 is proceeding along route 205 or taking a detour. Again, as described above, mobile device 105 will forgo an attempt to transmit location data to host system 110 when network connectivity for mobile device 105 fails to satisfy a threshold (e.g., signal strength and/or generation of protocol).

At operation 330, the processing device determines if the location data indicates that the mobile device is leaving the dead zone. In one embodiment, mobile device 105 determines its location (e.g., using geographical positioning receiver 140) and compares the determined location to dead zone threshold 220. In another embodiment, host system 110 determines location data received from mobile device 105 and compares the location to dead zone threshold 220. If the location data indicates that the mobile device is not currently leaving the dead zone (e.g., the location of mobile device 105 remains within dead zone threshold 220), method 300 proceeds to operation 340. If the location data indicates that the mobile device is leaving the dead zone (e.g., the location of mobile device 105 is outside of dead zone threshold 220), method 300 proceeds to operation 335.

At operation 335, the processing device updates the location data sampling rate in response to determining the location data indicates that the mobile device is leaving the dead zone. For example, if the location data indicates mobile device 105 is outside dead zone threshold 220, mobile device 105 updates the location data sampling rate/transmits location data to host system 110 less frequently (e.g., at the first rate). In one embodiment, mobile device 105 updates the location data sampling rate in response to detecting its location data indicates it is leaving the dead zone. In another embodiment, mobile device 105 updates the location data sampling rate in response to host system 110 detecting location data from mobile device 105 indicates mobile device 105 is leaving the dead zone and host system 110 instructing mobile device 105 to decrease the location data sampling rate.

At operation 340, in response to determining location data indicates that the mobile device is not currently leaving the dead zone, the processing device determines if the location data indicates that the mobile device is stationary. For example, if a threshold number of location data samples indicate that mobile device 105 has not moved beyond a margin of error or other threshold distance from a previous location, mobile device 105 can deem itself to be stationary. In another embodiment, mobile device 105 can use another input, such as an accelerometer, to determine if it is stationary. If the processing device determines if the location data indicates that the mobile device is stationary, method 300 proceeds to operation 345. If the processing device determines if the location data does not indicate that the mobile device is stationary, method 300 returns to operation 330. In another embodiment, method 300 omits operations 340-355 and returns to operation 330 when the location data indicates that the mobile device is not currently leaving the dead zone.

At operation 345, in response to detecting that the mobile device is stationary, the processing device decreases the location data sampling rate or the rate at which it attempts to send location data to the host server. For example, if the user of mobile device 105 stops at a location within dead zone 215, mobile device 105 can conserve processing resources by decreasing the frequency of or simply not reporting or attempting to report the stationary location to host system 110.

At operation 350, the processing device determines if the location data indicates that the mobile device remains stationary. For example, mobile device 105 can continue sampling location data (while minimizing or without reporting location data to host system 110) or mobile device 105 can sample location data in response to a detected change in position based upon another component, such as an accelerometer. If the processing device determines if the location data indicates that the mobile device is still stationary, method 300 returns to operation 350 to continue to wait until the mobile device begins to move again. If the processing device determines if the location data does not indicate that the mobile device is stationary, method 300 proceeds to operation 355.

At operation 355, in response to detecting that the mobile device is no longer stationary, the processing device triggers an increase in the sampling rate back to the increase rate (e.g., the second sampling rate). Method 300 proceeds by returning to operation 330 to detect when the mobile device is leaving or has left the dead zone.

Figure 4:
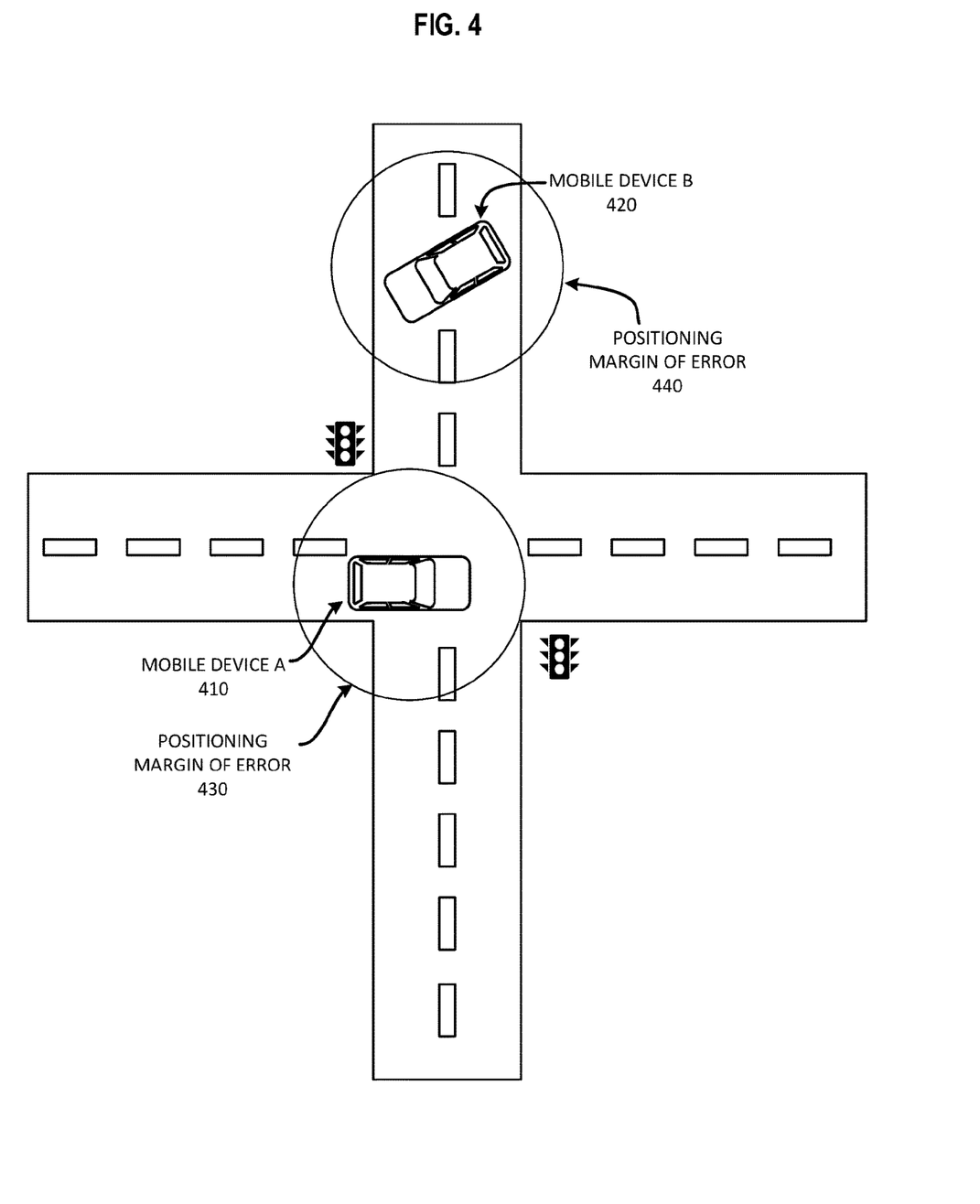
FIG. 4 illustrates an example of triggering dynamic tracking of a user device when current location data is insufficient to determine a direction of travel.

FIG. 4 illustrates an example of triggering dynamic tracking of a user device when current location data is insufficient to determine a direction of travel. Similar to description of FIG. 2, arrival prediction engine 155 uses an inputted address or latitude and longitude at which one or more mobile devices will each pick up or drop off someone or something at a destination. Arrival prediction engine 155 can use location data shared by each mobile device to determine a route between the mobile device and its destination and to determine an ETA of the mobile device at the destination. Mobile device A 410, however, is within or is a part of an automobile that has entered an intersection of two streets. While arrival prediction engine 155 may have determined a shortest, recommended, or most likely path for mobile device A 410 to proceed to a destination (based on a prior location), users can vary from such paths to make other stops, by missing a turn, etc. Arrival prediction engine 115 updates an ETA for mobile device A 410 at each or at least some of the current positions of mobile device A 410 as it travels to, e.g., alert a third-party when mobile device A 410 is approaching or will arrive at the destination. For example, the current position of mobile device A 410 corresponds to (can be a part of) a path that that continues in the same direction of travel along which mobile device A 410 has been moving (e.g., continuing along the current street) as well as a path that includes a turn in either direction (e.g., onto a different street). Each of these three possible directions correspond to paths that can have significantly different estimated times of arrival at the destination. In response to detecting this directional ambiguity, arrival prediction engine 155 can trigger an increase in the location data sampling rate of mobile device A 410 so as resolve the ambiguity of the direction of travel of mobile device A 410 and accurately update the ETA for mobile device A 410.

The position of mobile device B 420 represents another location of directional ambiguity. Mobile device B 420 is within or is a part of an automobile that is in a position between two lanes that serve opposite directions of traffic. For example, an automobile entering a road from a driveway lacks a prior location to indicate a direction of travel and can lead to a mobile device sharing a location that is not clearly in one directional lane or the other. In response to detecting this directional ambiguity, arrival prediction engine 155 can trigger an increase in the location data sampling rate of mobile device B 420 so as resolve the ambiguity of the direction of travel of mobile device B 420 and accurately update the ETA for mobile device B 420. Dynamic tracking of a mobile device due to directional ambiguity is described further with reference to FIG. 5.

Figure 5:
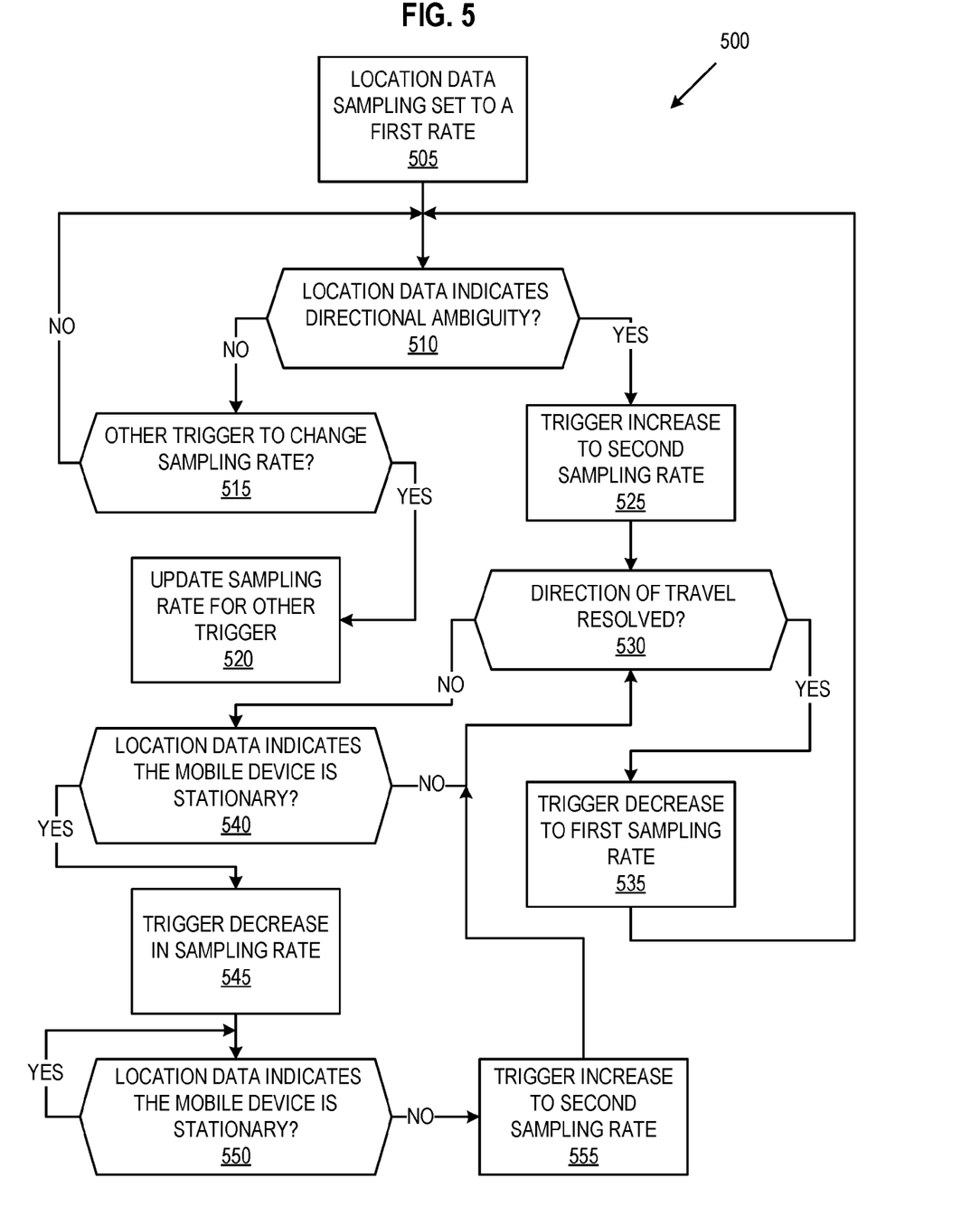
FIG. 5 is a flow chart illustrating an exemplary method of estimating arrival using dynamic tracking of a user device when current location data is insufficient to determine a direction of travel.

In one embodiment, host system 110 sets a threshold distance around locations of directional ambiguity to serve as a trigger for dynamic tracking of a user device. For example, arrival prediction engine 155 can set a threshold distance around intersections in a similar manner to the dead zone thresholds described above. In one embodiment, arrival prediction engine 155 or the mobile device determines that a mobile device is in a location of directional ambiguity (or threshold distance of such a location) based on the current location/position data of the mobile device. In another embodiment, arrival prediction engine 155 or the mobile device determines that a mobile device is in a location of directional ambiguity (or threshold distance of such a location) based on the current location/position data of the mobile device including the positioning margin error. For example, the accuracy of a positioning system can be subject to a margin of error of multiple feet or meters. Mobile device A 410 is illustrated as having positioning margin of error 430. The overlap of positioning margin of error 430 and an intersection or other location of directional ambiguity can serve as a trigger for dynamic tracking of mobile device A 410. Similarly, mobile device B 420 is illustrated as having positioning margin of error 440, which can be used to trigger dynamic tracking of mobile device B 420 when positioning margin of error 440 overlaps with a location of directional ambiguity. FIG. 5 is a flow chart illustrating an exemplary method of estimating arrival using dynamic tracking of a user device when current location data is insufficient to determine a direction of travel. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 500 is performed by location data controller 135, arrival prediction engine 155, or a combination thereof. For the purpose of illustrating an example, method 500 is described below as being performed by a processing device.

At operation 505, the processing device sets the location data sampling to a first rate. Similar to the description of method 300 above, the first location data sampling rate can be set such that the rate conserves resources until triggered to sample more frequently. Mobile device 105 can share location data periodically and/or based upon a change in location. In one embodiment, mobile device 105, using the first rate, shares infrequent location updates in intervals of one or more minutes (e.g., 5 minutes) or when the location of mobile device 105 has changed by a significant amount (e.g., 500 meters).

At operation 510, the processing device determines if the location data indicates that the mobile device is in a location of directional ambiguity. For example, the processing device determines if a current or recent location of the mobile device is in a position that is insufficient for detection of a direction of travel for the mobile device. In one embodiment, the processing device determines that the location data is insufficient to detect a direction of travel when the location data falls within a threshold distance of an intersection, as illustrated with mobile device A 410.

In another embodiment, the processing device determines that the location data is insufficient to detect a direction of travel when the location data falls within a threshold distance of each of multiple lanes of a roadway that carry traffic in different directions from one another, as illustrated with mobile device B 420. For example, if the mobile device's location or margin of error for the mobile device's location overlaps two lanes of traffic that flow in different directions, the processing device determines that the location data is a location of directional ambiguity. In some embodiments, the processing device uses multiple, subsequent location samples to resolve this ambiguity. For example, a narrow two-lane roadway, each lane carrying opposite directions of traffic, can result in directional ambiguity for a single location but when multiple locations are considered, the processing device can determine that the mobile device is progressing in one direction or the other.

In yet another embodiment, the processing device determines that the location data is insufficient to detect a direction of travel when the location data of subsequent location samples does not align with a direction of travel of a lane of the roadway. For example, when a mobile device enters a roadway from a driveway, subsequent locations can show the mobile device moving in a direction perpendicular or near perpendicular to the direction of traffic of the lane in which the latest location of the mobile device, as also illustrated with mobile device B 420.

If the location data indicates that the location data is sufficient to detect a direction of travel of the mobile device, method 500 proceeds to operation 515. If the location data indicates that the location data is insufficient to detect a direction of travel of the mobile device, method 500 proceeds to operation 525.

At operation 515, similar to the description of operation 315 above, the processing device determines if another trigger has occurred to change the location data sampling rate. At operation 520, similar to the description of operation 315 above, the processing device updates the location data sampling rate in response to the other trigger.

At operation 525, the processing device triggers an increase in location sampling to a second rate in response to the determination of directional ambiguity. For example, mobile device 105 updates the location data sampling rate/transmits location data to host system 110 more frequently (e.g., at the second rate) in intervals of one or more seconds (e.g., every second) and/or based upon any detectable change in location of mobile device 105. As a result, host system 110 can more quickly resolve the directional ambiguity and update an ETA for the mobile device accordingly. In one embodiment, similar to the description above of operation 323, the processing device triggers the increase in the location sampling rate when the location data indicates that the ETA for the mobile device to arrive at the destination satisfies a time threshold and forgoes triggering the increase when the ETA the mobile device to arrive at the destination fails to satisfy the time threshold. Also as described above, mobile device 105 will forgo an attempt to transmit location data to host system 110 when network connectivity for mobile device 105 fails to satisfy a threshold (e.g., signal strength and/or generation of protocol).

At operation 530, the processing device determines if the direction of travel for the mobile device has been resolved. For example, using the second rate, mobile device 105 determines its current location (e.g., using geographical positioning receiver 140) and determines if two or more subsequent locations (e.g., the current location and location that triggered the directional ambiguity) align with a direction of travel of a lane of the roadway on which mobile device 105 is traveling. If the direction of travel for the mobile device has been resolved, method 500 proceeds to operation 535. If the direction of travel for the mobile device has not been resolved, method 500 proceeds to operation 540.

At operation 535, the processing device updates the location data sampling rate in response to determining the location data indicates that the directional ambiguity has been resolved. For example, if the location data indicates mobile device 105 is moving in a direction consistent with the expected traffic of a lane of a roadway, mobile device 105 updates the location data sampling rate/transmits location data to host system 110 less frequently (e.g., at the first rate). In one embodiment, mobile device 105 updates the location data sampling rate in response to detecting its location data resolves the directional ambiguity. In another embodiment, mobile device 105 updates the location data sampling rate in response to host system 110 detecting the resolution of directional ambiguity and host system 110 instructing mobile device 105 to decrease the location data sampling rate. Method 500 can return to operation 510 and proceed as described as above.

At operation 540, the processing device determines if the location data indicates that the mobile device is stationary. For example, if a threshold number of location data samples indicate that mobile device 105 has not moved beyond a margin of error or other threshold distance from a previous location, mobile device 105 can deem itself to be stationary. In another embodiment, mobile device 105 can use another input, such as an accelerometer, to determine if it is stationary. If the processing device determines if the location data indicates that the mobile device is stationary, method 500 proceeds to operation 545. If the processing device determines if the location data does not indicate that the mobile device is stationary, method 500 returns to operation 530. In another embodiment, method 500 omits operations 540-555 and returns to operation 530 when the location data indicates that the mobile device is not currently leaving the dead zone.

At operation 545, in response to detecting that the mobile device is stationary, the processing device decreases the location data sampling rate or the rate at which it attempts to send location data to the host server. For example, if the user of mobile device 105 stops in a parking lot, in an intersection, in traffic, etc., mobile device 105 can conserve processing resources by decreasing the frequency of or simply not reporting or attempting to report the stationary location to host system 110.

At operation 550, the processing device determines if the location data indicates that the mobile device remains stationary. For example, mobile device 105 can continue sampling location data (while minimizing or without reporting location data to host system 110) or mobile device 105 can sample location data in response to a detected change in position based upon another component, such as an accelerometer. If the processing device determines if the location data indicates that the mobile device is still stationary, method 500 returns to operation 550 to continue to wait until the mobile device begins to move again. If the processing device determines if the location data does not indicate that the mobile device is stationary, method 500 proceeds to operation 555.

At operation 555, the processing device in response to detecting that the mobile device is no longer stationary, the processing device triggers an increase in the sampling rate back to the increase rate (e.g., the second sampling rate). Method 500 proceeds by returning to operation 530 to detect if/when the direction of travel of the mobile device has been resolved.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) can be used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/operations or the features/operations may be performed in differing orders. Additionally, the methods described herein may be repeated or performed in parallel with one another or in parallel with different instances of the same or similar methods.

What is claimed is:

1. A method comprising:

obtaining location data representing a current location of a mobile device, wherein the location data for the mobile device is taken at a first sampling rate;

determining that the location data indicates that the mobile device is approaching a geographic area having a history of wireless communication loss and an estimated time of arrival for the mobile device to reach a destination satisfies a time threshold; and triggering an increase in location data sampling from the first sampling rate to a second sampling rate in response to determining the mobile device is approaching the geographic area having a history of wireless communication loss and the estimated time of arrival for the mobile device to reach the destination satisfies a time threshold.

2. The method of claim 1, comprising:

reading trip history of a plurality of trips through the geographic area reported by one or more mobile devices;

determining that a number of the plurality of trips through the geographic area that included wireless communication loss in the geographic area satisfies a threshold; and designating the geographic area as having a history of wireless communication loss in response to determining that the number of trips satisfies the threshold.

3. The method of claim 1, wherein determining that the location data indicates that the mobile device is approaching the geographic area includes detecting that the location data is within threshold distance of the geographic area having a history of wireless communication loss.

4. The method of claim 1, wherein determining that the location data indicates that the mobile device is approaching the geographic area includes detecting an estimated route for the mobile device to a destination, the estimated route passing through the geographic area having a history of wireless communication loss.

5. The method of claim 1, further comprising:
reading updated location data representing a new location of the mobile device;
determining that the updated location data indicates that the mobile device exited the geographic area having a history of wireless communication loss; and
triggering a decrease in location data sampling from the second sampling rate to the first sampling rate in response to determining the mobile device exited the geographic area having a history of wireless communication loss.

6. The method of claim 5, wherein determining that the updated location data indicates that the mobile device exited the geographic area includes detecting that the updated location data is outside of a threshold distance of the geographic area.

7. The method of claim 1, further comprising:
causing the mobile device to pause the second sampling rate in response to detecting that the mobile device is stationary.

8. A non-transitory computer-readable storage medium comprising instructions that, when executed by a processing device, cause the processing device to:
read location data representing a current location of a mobile device, wherein the location data for the mobile device is taken at a first sampling rate;
determine that the location data indicates that the mobile device is approaching a geographic area having a history of wireless communication loss and an estimated time of arrival for the mobile device to reach a destination satisfies a time threshold; and
trigger an increase in location data sampling from the first sampling rate to a second sampling rate in response to determining the mobile device is approaching the geographic area having a history of wireless communication loss and the estimated time of arrival for the mobile device to reach the destination satisfies a time threshold.

9. The non-transitory computer-readable storage medium of claim 8, wherein the processing device is further to:
read trip history of a plurality of trips through the geographic area reported by one or more mobile devices;
determine that a number of the plurality of trips through the geographic area that included wireless communication loss in the geographic area satisfies a threshold; and
designate the geographic area as having a history of wireless communication loss in response to determining that the number of trips satisfies the threshold.

10. The non-transitory computer-readable storage medium of claim 8, wherein determining that the location data indicates that the mobile device is approaching the geographic area includes detecting that the location data is within threshold distance of the geographic area having a history of wireless communication loss.

11. The non-transitory computer-readable storage medium of claim 8, wherein determining that the location data indicates that the mobile device is approaching the geographic area includes detecting an estimated route for the mobile device to a destination, the estimated route passing through the geographic area having a history of wireless communication loss.

12. The non-transitory computer-readable storage medium of claim 8, wherein the processing device is further to:
reading updated location data representing a new location of the mobile device;
determining that the updated location data indicates that the mobile device exited the geographic area having a history of wireless communication loss; and
triggering a decrease in location data sampling from the second sampling rate to the first sampling rate in response to determining the mobile device exited the geographic area having a history of wireless communication loss.

13. The non-transitory computer-readable storage medium of claim 12, wherein determining that the updated location data indicates that the mobile device exited the geographic area includes detecting that the updated location data is outside of a threshold distance of the geographic area.

14. The non-transitory computer-readable storage medium of claim 8, wherein the processing device is further to:
causing the mobile device to pause the second sampling rate in response to detecting that the mobile device is stationary.

15. An apparatus comprising:
a processing device; and
a memory coupled to the processing device, the memory storing instructions which, when executed by the processing device, cause the apparatus to:
read location data representing a current location of a mobile device, wherein the location data for the mobile device is taken at a first sampling rate;
determine that the location data indicates that the mobile device is approaching a geographic area having a history of wireless communication loss and an estimated time of arrival for the mobile device to reach a destination satisfies a time threshold; and
trigger an increase in location data sampling from the first sampling rate to a second sampling rate in response to determining the mobile device is approaching the geographic area having a history of wireless communication loss and the estimated time of arrival for the mobile device to reach the destination satisfies a time threshold.

16. The apparatus of claim 15, wherein the processing device is further to:
read trip history of a plurality of trips through the geographic area reported by one or more mobile devices;
determine that a number of the plurality of trips through the geographic area that included wireless communication loss in the geographic area satisfies a threshold; and
designate the geographic area as having a history of wireless communication loss in response to determining that the number of trips satisfies the threshold.

17. The apparatus of claim 15, wherein determining that the location data indicates that the mobile device is approaching the geographic area includes detecting that the location data is within threshold distance of the geographic area having a history of wireless communication loss.

18. The apparatus of claim 15, wherein determining that the location data indicates that the mobile device is approaching the geographic area includes detecting an estimated route for the mobile device to a destination, the estimated route passing through the geographic area having a history of wireless communication loss.

19. The apparatus of claim 15, wherein the processing device is further to:
reading updated location data representing a new location of the mobile device;

determining that the updated location data indicates that the mobile device exited the geographic area having a history of wireless communication loss; and triggering a decrease in location data sampling from the second sampling rate to the first sampling rate in response to determining the mobile device exited the geographic area having a history of wireless communication loss.

20. The apparatus of claim 19, wherein determining that the updated location data indicates that the mobile device exited the geographic area includes detecting that the updated location data is outside of a threshold distance of the geographic area.

\* \* \* \* \*